US008467617B2

(12) United States Patent
Dvir et al.

(10) Patent No.: US 8,467,617 B2
(45) Date of Patent: *Jun. 18, 2013

(54) COMPRESSING HIGH RESOLUTION IMAGES IN A LOW RESOLUTION VIDEO

(75) Inventors: Ira Dvir, Rishon-LeZion (IL); Nitzan Rabinowitz, Rosh HaAyin (IL)

(73) Assignee: Human Monitoring Ltd., Givat HaShlosha (IL)

(*) Notice: Subject to any disclaimer, the term of this patent is extended or adjusted under 35 U.S.C. 154(b) by 0 days.

This patent is subject to a terminal disclaimer.

(21) Appl. No.: 13/229,789

(22) Filed: Sep. 12, 2011

(65) Prior Publication Data

US 2011/0317931 A1    Dec. 29, 2011

Related U.S. Application Data

(63) Continuation of application No. 11/882,811, filed on Aug. 6, 2007, now Pat. No. 8,019,167.

(60) Provisional application No. 60/878,063, filed on Jan. 3, 2007, provisional application No. 60/878,062, filed on Jan. 3, 2007.

(51) Int. Cl.
*G06K 9/36* (2006.01)

(52) U.S. Cl.
USPC .......................................... 382/232

(58) Field of Classification Search
USPC ............. 382/232, 236, 238–240, 248, 250; 341/50–51; 375/240.02–240.03, 240.1, 240.11–240.13, 240.16, 240.18, 240.2, 240.24; 348/390.1, 394.1, 404.1, 407.1, 416.1, 420.1, 348/424.1, 430.1–431.1; 715/723–726, 729; 725/38

See application file for complete search history.

(56) References Cited

U.S. PATENT DOCUMENTS

| 5,107,345 | A   | * | 4/1992  | Lee ................................ 382/250  |
| 5,144,424 | A   | * | 9/1992  | Savatier .................... 375/240.03      |
| 5,146,324 | A   |   | 9/1992  | Miller et al.                                 |
| 5,434,623 | A   |   | 7/1995  | Coleman et al.                                |
| 5,793,892 | A   | * | 8/1998  | Pan et al. ........................ 382/232   |
| 6,292,589 | B1  | * | 9/2001  | Chow et al. .................... 382/239      |
| 6,721,952 | B1  |   | 4/2004  | Guedalia et al.                               |
| 6,826,232 | B2  | * | 11/2004 | Chen et al. ................ 375/240.18       |
| 6,853,318 | B1  | * | 2/2005  | Rabbani et al. .................. 341/50      |
| 7,035,453 | B2  |   | 4/2006  | Liu                                           |
| 7,039,241 | B1  | * | 5/2006  | Van Hook ...................... 382/232       |
| 7,263,232 | B2  |   | 8/2007  | Srinivasan                                    |

(Continued)

FOREIGN PATENT DOCUMENTS

| EP | 0703711    | 3/1996 |
| JP | 07-131657  | 5/1995 |

(Continued)

OTHER PUBLICATIONS

Response Dated Dec. 8, 2011 to Official Action of Jun. 9, 2011 From the US Patent and Trademark Office Re. U.S. Appl. No. 12/003,934.

(Continued)

*Primary Examiner* — Jose Couso (57) ABSTRACT

A method for compressing an image as a sequence of video frames, comprising dividing the image into a plurality of tiles and compressing a tile, or part thereof, as a frame in the video sequence.

16 Claims, 7 Drawing Sheets

U.S. PATENT DOCUMENTS

| | | | |
|---|---|---|---|
| 7,768,552 | B1 | 8/2010 | Doron |
| 7,889,790 | B2 | 2/2011 | Sun |
| 7,936,936 | B2 | 5/2011 | Gentric |
| 8,019,167 | B2 * | 9/2011 | Dvir et al. .................. 382/232 |
| 2002/0076115 | A1 | 6/2002 | Leeder et al. |
| 2004/0213349 | A1 | 10/2004 | Zador et al. |
| 2004/0228537 | A1 | 11/2004 | Yeung et al. |
| 2006/0104346 | A1 | 5/2006 | Li et al. |
| 2006/0114991 | A1 | 6/2006 | Kim et al. |
| 2006/0155531 | A1 | 7/2006 | Miller |
| 2006/0277316 | A1 | 12/2006 | Wang et al. |
| 2007/0058715 | A1 | 3/2007 | Kim et al. |
| 2007/0133681 | A1 | 6/2007 | Ho |
| 2007/0140334 | A1 | 6/2007 | Sun |
| 2007/0189623 | A1 | 8/2007 | Ryu |
| 2007/0206871 | A1 | 9/2007 | Jalil et al. |
| 2008/0159387 | A1 | 7/2008 | Dvir et al. |
| 2008/0159639 | A1 | 7/2008 | Dvir et al. |
| 2008/0165843 | A1 | 7/2008 | Dvir et al. |
| 2009/0028447 | A1 | 1/2009 | Yatabe et al. |

FOREIGN PATENT DOCUMENTS

| | | |
|---|---|---|
| JP | 2001-069392 | 3/2001 |
| JP | 2003-009154 | 1/2003 |
| JP | 2003-264816 | 9/2003 |
| JP | 2006-115001 | 4/2006 |
| WO | WO 96/34495 | 10/1996 |
| WO | WO 2008/081458 | 7/2008 |
| WO | WO 2008/081460 | 7/2008 |
| WO | WO 2008/081461 | 7/2008 |

OTHER PUBLICATIONS

Advisory Action Before the Filing of an Appeal Brief Dated Apr. 13, 2011 From the US Patent and Trademark Office Re. U.S. Appl. No. 11/882,811.

International Search Report Dated Apr. 7, 2009 From the International Searching Authority Re.: Application No. PCT/IL2008/000030.

International Search Report Dated May 12, 2009 From the International Searching Authority Re.: Application No. PCT/IL2008/000029.

International Search Report Dated Apr. 27, 2009 From the International Searching Authority Re.: Application No. PCT/IL2008/000027.

Notice of Allowance Dated May 12, 2011 From the US Patent and Trademark Office Re. U.S. Appl. No. 11/882,811.

Official Action Dated Feb. 7, 2011 From the US Patent and Trademark Office Re. U.S. Appl. No. 11/882,811.

Official Action Dated Jun. 9, 2011 From the US Patent and Trademark Office Re. U.S. Appl. No. 12/003,934.

Official Action Dated Jun. 21, 2011 From the US Patent and Trademark Office Re. U.S. Appl. No. 11/987,639.

Official Action Dated Sep. 22, 2010 From the US Patent and Trademark Office Re. U.S. Appl. No. 11/882,811.

Response Dated Apr. 7, 2011 to Official Action of Feb. 7, 2011 From the US Patent and Trademark Office Re. U.S. Appl. No. 11/882,811.

Response Dated Jan. 20, 2010 to Official Action of Sep. 22, 2010 From the US Patent and Trademark Office Re. U.S. Appl. No. 11/882,811.

Written Opinion Dated Apr. 7, 2009 From the International Searching Authority Re.: Application No. PCT/IL2008/000030.

Written Opinion Dated May 12, 2009 From the International Searching Authority Re.: Application No. PCT/IL2008/000029.

Written Opinion Dated Apr. 27, 2009 From the International Searching Authority Re.: Application No. PCT/IL2008/000027.

Chee "Survey of Progressive Image Transmission Methods", International Journal of Imaging Systems and Technology, XP000805935, 10(1): 3-19, Jan. 1999. Abstract, p. 13, 1-h Col., Lines 8-44, p. 14, r-h Col., Line 12-p. 16, 1-h Col., Line 10, Figs.1, 12-14.

Chen et al. "An Imprecise Algorithm for Real-Time Compressed Image and Video Transmission", Proceedings of the Sixth International Conference on Computer Communications and Networks, IEEE, Los Alamitos, CA, USA, XP010245777, p. 390-397, Sep. 22, 1997. Abstract, p. 390, r-h Col., Lines 14-22, p. 391, r-h Col., Lines 6-12, p. 392, r-h Col., Line 30-p. 396, 1-h Col., Line 1, p. 396, r-h Col., Lines 7-14, p. 397, 1-h Col., Lines 1-3, Fig.2.

Chrysalis et al. "Line-Based, Reduced Memory, Wavelet Image Compression", IEEE Transactions on Image Processing, XP011025538, 9(3): 378-389, Mar. 2000. Abstract, p. 379, r-h Col., Lines 5-15, p. 379, r-h Col., Line 41-p. 380, 1-h Col., Line 21, p. 381, r-h Col., Line 25-p. 382, 1-h Col., Line 29.

Daubos et al. "High-Quality Still Images From the Video Frame Sequences", Investigative Image Processing II, Proceedings of SPIE, XP002525539, 4709: 49-59, 2002. Abstract, p. 52, Lines 15-19, p. 53, Lines 10-16, Fig.3.

Donderi "An Information Theory Analysis of Visual Complexity and Dissimilarity", Perception, XP009102155, 35(6): 823-835, 2006.

Hafner "Low Bit-Rate Image and Video Coding With Weighted Finite Automata", Mensch & Buch Verlag, Dissertation zur Erlangung des naturwissenschaftlichen Doktorgrades an der Bayerischen Julius-Maxilimilians-Universit?t W?rzburg, XP002525540, p. 1-146, 1999. Chap.4, Appendix A, p. 103, Lines 4-13, p. 106, Lines 1-21, Tables 8.7, 8.8.

Irani et al. "Video Compression Using Mosaic Representations", Signal Processing: Image Communication, XP004047098, 7(4): 529-552, Nov. 1995.

Pandel "Variable Bit-Rate Image Sequence Coding With Adaptive Quantization", Signal Processing: Image Communication, XP024241777, 3(2-3): 123-128, Jun. 1, 1991.

Translation of Notice of Reason for Rejection Dated Jul. 10, 2012 From the Japanese Patent Office Re. Application No. 2009-544493.

Official Action Dated Mar. 22, 2012 From the US Patent and Trademark Office Re. U.S. Appl. No. 12/003,934.

Official Action Dated Oct. 12, 2012 From the US Patent and Trademark Office Re. U.S. Appl. No. 12/003,934.

Translation of Notice of Reason for Rejection Dated Jan. 18, 2013 From the Japanese Patent Office Re. Application No. 2009-544493.

\* cited by examiner

COMPRESSING HIGH RESOLUTION IMAGES IN A LOW RESOLUTION VIDEO

RELATED APPLICATIONS

This application is a continuation of U.S. patent application Ser. No. 11/882,811 filed on Aug. 6, 2007, which claims the benefit of priority under 35 USC 119(e) of U.S. Provisional Patent Application Nos. 60/878,062 and 60/878,063, both filed on Jan. 3, 2007.

The contents of all of the above applications are incorporated by reference as if fully set forth herein.

FIELD OF THE INVENTION

This invention relates to a method and apparatus for compressing and/or decompressing of images. Some embodiments relate to compressing an image via a video sequence, including an encryption of an image in a video sequence.

BACKGROUND OF THE INVENTION

Still image compression is one of the most common applications in storing and transfer of pictures, particularly for mobile devices such as cameras, scanners, handsets and other portable devices such as PDAs (Portable Personal Assistant).

The resolution of pictures taken by modern devices have been growing dramatically and the compression of such large resolution still images (e.g. between 1.2 to 12+ Mega Pixels) demands huge computational and memory resources. These limitations call for an efficient compression scheme that will reduce storage while preserving a satisfactory quality for its intended use.

The still and video cameras, like many handheld devices and cellular handsets, capture high resolution images. Typically these devices use the JPEG method for compression of the images. The JPEG format is limited in its compression ratio so that in order to store high quality and/or high resolution pictures an unacceptable size is needed, (see for example, http://white.stanford.edu/~brian/psy221/reader/Wallace-.JPEG.pdf, http://www.jpeg.org, the disclosures of which are incorporated herein by reference).

SUMMARY OF THE INVENTION

An aspect of some exemplary embodiments of the invention relates to compressing an image by encoding it as a sequence of video frames, employing spatial and/or temporal compression, and consequent decompressing thereof.

In exemplary embodiments of the invention, the image is divided into sub-images, or 'tiles'. The tiles are constructed into a video sequence such that a tile, or its derivation, forms a frame of lower resolution than the image.

In exemplary embodiments of the invention, a plurality of tiles are constructed into one or more groups of frames (GOP—Group or Pictures) in the video sequence. Each group begins with a frame of a spatially compressed tile (I-frame), followed by one or more 'intermediate' frames constructed from other tiles. An intermediate frame comprises a difference between the tile of a preceding frame and the tile of the current frame (P-frame), wherein the difference is spatially and/or temporally compressed.

An aspect of some exemplary embodiments of the invention relates to a scaleable compression of an image by coding it as a sequence of video frames, employing spatial and/or temporal compression to a plurality of duplicate tiles, and consequent decompression thereof.

In exemplary embodiments of the invention, duplicate tiles are encoded with different compressions, allowing a restoration to different qualities in a subsequent decoding.

In exemplary embodiments of the invention, a plurality of duplicate tiles are constructed into a GOP in the video sequence. Each group begins with a frame of a spatially compressed tile (I-frame), followed by one or more intermediate frames formed from other duplicate tiles. An intermediate frame comprises a difference between a decoded (decompressed) preceding frame and a duplicate tile (P-frame), wherein the difference is spatially and/or temporally compressed. A subsequent intermediate frame comprises the difference between a combination of the restored first frame and the restored next frame, wherein the difference is spatially and/or temporally compressed. Subsequent intermediate frame are constructed similarly, comprising the compressed difference relative to the combination of the previous decompressed frames.

An aspect of some exemplary embodiments of the invention relates to an intermittent compression of an image by coding it as a sequence of video frames, employing spatial and/or temporal compression, and consequent decompression thereof.

In exemplary embodiments of the invention, a 'tile' comprises a row, or part thereof, of the image, allowing a fast consecutive input for encoding, avoiding random addressing and buffering memory, or requiring only a small buffer relative to a random tile. Optionally, depending on the image organization, a column, rather than a row, is accessed.

With the intermittent compression capability, the encoding may be performed without interrupting other (more critical) operations of the device. Additionally the compression may be performed 'on the fly' (synchronously) such as with a scanner which consecutively provides image lines as the scanning proceeds (e.g. moving head in a flatbed scanner or deflecting ray in laser scanner) without having to store the whole image (or large part thereof).

In exemplary embodiments of the invention, compression comprises a quantization of a brightness or color range into smaller range. Optionally the quantization comprises constructing a set of color indexes with a corresponding palette. Optionally or additionally, the transformation comprises a transformation DFT such as DCT, or a wavelet transformation, or other methods of the art such as vector or fractal compression. Optionally, the coefficients of the transformation (e.g. coefficients of a DCT) are quantized.

In exemplary embodiments of the invention, constructing a frame constructed from a tile comprises a compression that is responsive to contents of the image, such as entropy, entropy deficiency or geometry. Optionally, the compression is responsive to the required compression, for example, in terms of bit rate or quality of a decoded part of the image. Optionally, the compression is based on sub-divisions of a tile (blocks).

In exemplary embodiments of the invention, an intermediate frame comprises a difference (as described above) relative to a previous and subsequent frame (B-frame).

The intermediate frames, comprising a difference, or constructed from a difference, relative to other frames may be considered as pseudo-temporal and/or pseudo-motion, or representations (hereinafter, in the specifications and claims, 'motion' and 'temporal').

In exemplary embodiments of the invention, an existing video coder, or part thereof, is utilized to encode an image in a video sequence.

In exemplary embodiments of the invention, the video sequence is decoded (decompressed) and the decoded frames are selected and used to construct the image, or part thereof.

In exemplary embodiments of the invention, the decoded image, or part thereof, is displayed. Optionally, the display dimension is smaller than the image or of lower quality. Optionally, a decoded or generated thumbnail is displayed. Optionally or alternatively, the compressed video sequence is stored for later use.

Since portable devices such a wireless (e.g. cellular) phones are frequently equipped with video encoders, the compression scheme does not require additional resources (or only negligible ones), while providing an efficient compression for varying degrees of qualities. A high quality compression thus may be obtained within the capabilities of portable devices in terms of memory, processing and transmission.

In the specifications and claims, unless otherwise specified, the term 'encode' or 'code' implies construction of data into a video sequence and compression of the data, whereas 'decode' implies reconstruction of the data, at least to a certain quality. The term 'video' implies also a pseudo-video sequence, namely, a sequence not necessarily representing a motion of objects.

An exemplary embodiment of the invention comprises a method for compressing an image as a sequence of video frames, comprising:

(a) dividing the image into a plurality of tiles; and (b) compressing a tile, or part thereof, as a frame in the video sequence.

Optionally, the compression comprises a spatial and/or temporal and/or motion compression.

Optionally, the compression is responsive to the geometry and/or entropy and/or entropy deficiency of a tile or part thereof.

Optionally, different tiles are compressed in different compression levels.

In exemplary embodiments of the invention, the compression comprises:

(a) dividing a tile into a plurality of blocks;

(b) compressing a one or more blocks in a frame; wherein (c) a block size and/or shape is responsive to the compression level of a tile and/or compression ratio and/or required bit-rate and/or contents of the image or part thereof.

Optionally, a block extent parallel to the image dimension. comprises at least one of 1, 2, 4, 8, 16, 32 or 64 pixels.

In exemplary embodiments of the invention, the video sequence comprises metadata comprising information on the correspondence between a frame and a tile in the image.

In exemplary embodiments of the invention, the compression uses an existing equipment and/or software. Optionally, the equipment comprises a chip-set. Optionally, the equipment comprises a standard codec or part thereof. Optionally, the codec is compatible with a standard video format.

An exemplary embodiment of the invention comprises a method for decoding a compressed image, comprising:

(a) decoding frames of the video sequence as tiles of the image; and (b) combining the tiles according to their relative positions in the image.

Optionally, the decompression uses an existing equipment and/or software. Optionally, the equipment comprises a standard codec or part thereof. Optionally, the codec is compatible with a standard video format.

An exemplary embodiment of the invention comprises a method for a scalable compression of an image in a sequence of video frames, comprising:

(a) dividing the image into a plurality of tiles; and (b) compressing a plurality of duplicate tiles, or part thereof, as frames in a video sequence.

Optionally, the duplicate tiles are compressed as an I-frame and at least one P-frame which comprises a spatial and/or temporal compression of a difference between a duplicate tile and a decoded I-frame or a difference between a duplicate tile and a combination of preceding reconstructed frames. Optionally, the video sequence comprises metadata comprising information on the correspondence between a frame and a tile in the image.

In exemplary embodiments of the invention, the compression uses an existing equipment and/or software. Optionally, the equipment comprises a chip-set. Optionally, the equipment comprises a standard codec or part thereof.

An exemplary embodiment of the invention comprises a method for decoding a compressed image, comprising:

(a) decoding frames of the video sequence as tiles of the image; and (b) combining the tiles according to their relative positions in the image.

Optionally, the image is decompressed responsive to the compression levels of a plurality of compressed duplicate tiles, comprising (a) determining frames or combination of frames that provide an acceptable or available compressed details;

(b) decoding the determined frames or frames as a tile of an image; and (c) combining the tile according to its relative position in the image.

Optionally, the metadata is used to locate the relative position of a tile in the image.

In exemplary embodiments of the invention, the decompression uses an existing equipment and/or software. Optionally, the equipment comprises a standard codec or part thereof.

An exemplary embodiment of the invention comprises a method for an intermittent compression of an image in a sequence of video frames, comprising:

(a) determining a row or column of pixels in the image; and (b) compressing the pixels in a frame of the video.

Optionally, a row or column comprises one or more rows or columns or part thereof. Optionally, the compression is carried out synchronously with a piece-wise acquisition of the image.

BRIEF DESCRIPTION OF THE DRAWINGS

Non-limiting examples of embodiments of the present invention are described with reference to figures listed below. In the drawings which follow, identical or equivalent or similar structures, elements, or parts that appear in more than one drawing are generally labeled with the same numeral in the drawings in which they appear. Dimensions of components and features shown in the figures are chosen for convenience and clarity of presentation and are not necessarily shown to scale.

DETAILED DESCRIPTION OF EMBODIMENTS OF THE INVENTION

Figure 7:
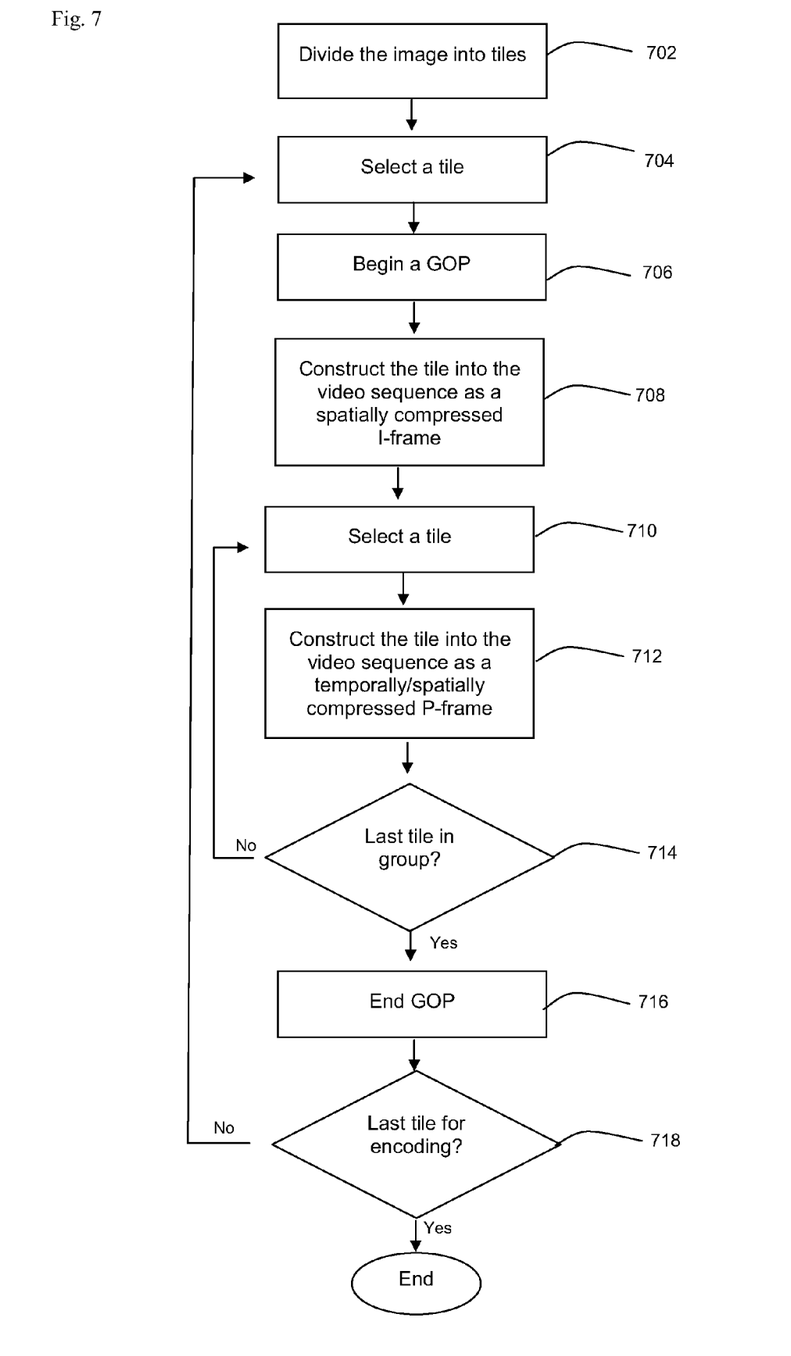
FIG. 7 schematically illustrates a flowchart outlining a sequence of operations of assembling an image in a video sequence, in accordance with exemplary embodiments of the invention.

The discussion below is divided into sections with headers which are intended for clarity and readability only.
Rationale Typically video encoders support lower resolutions than a typical still camera. For example, MPEG-2/4 and AVC encoders are limited by levels to a practical maximum of 1920×1080 and most of them support only Baseline Profile @ Level 3, which is limited to 720×576 PAL or 720×480 NTSC resolution. Since most sensors allow multi-mega pixels, it is not practical to feed such high resolution images to the existing video encoders.
Operation Outline FIG. 7 schematically illustrates a flowchart outlining a sequence of operation for assembling an image 102 in a video sequence. Reference is made also FIG. 1 that schematically illustrates an image and its division, and FIG. 2 that schematically illustrates how image tiles are arranged as frames in a video sequence 200, in accordance with exemplary embodiments of the invention.

Figure 1:
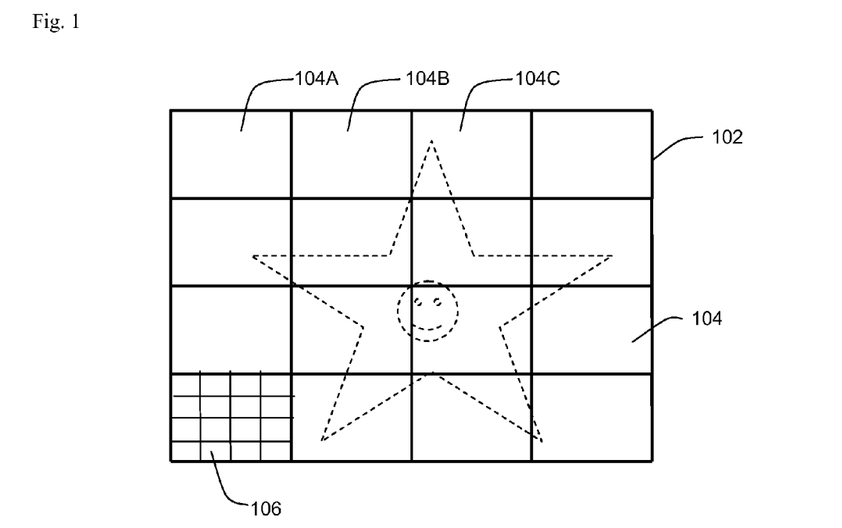
FIG. 1 schematically illustrates an image and its division into tiles and blocks, in accordance with exemplary embodiments of the invention.
Figure 2:
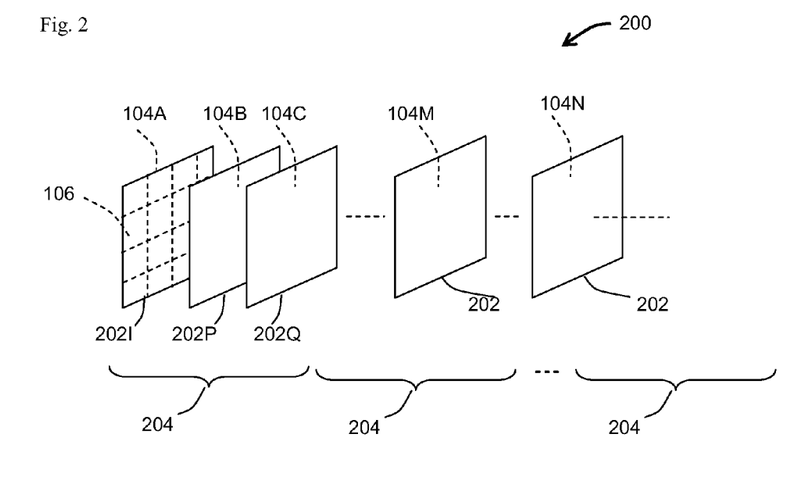
FIG. 2 schematically illustrates how image tiles are arranged as frames in a video sequence, in accordance with exemplary embodiments of the invention.

In exemplary embodiments of the invention, image 102 is divided into tiles 104 (702). A video sequence 200 is started comprising opening a GOP (704). A tile is selected, for example, 104A (7046) and used to construct an I-frame, the construction comprises a spatial compression of the tile contents. GOP 204 begins with an I-frame 202I constructed from 104A (708). Another tile, for example, 104B, is selected (710) and constructed in GOP 204 as a P-frame (intermediate frame) 202P following 202I (712). The construction of 202P comprises a difference to frame 202A, wherein the difference is compressed (temporal/spatial compression). P-frame 202Q is similarly constructed from 104C, the difference comprises a compressed difference to 202P. If a frame is the last for a GOP (714), for example frame 202Q in GOP 204, then the GOP is ended (716). If there are more tiles 104 to assemble in video sequence 200 (718) the procedure is repeated with a new GOP (704), otherwise video sequence 200 is ended.

in exemplary embodiments of the invention, the compression comprises a scalable compression, wherein the construction of 202P comprises a difference to a decompressed frame 202I, and the difference is compressed (temporal/spatial compression). P-frame 202Q is similarly constructed from 104C, the difference comprises a compressed difference to the combination of decompressed 202A and 202B (scaleable compression) as discussed later on.
Division of the Image FIG. 1 schematically illustrates an image 102 and its division into tiles 104 and further into blocks 106, in accordance with exemplary embodiments of the invention.

In exemplary embodiments of the invention, image 102 dimensions are 640×480 pixels (VGA) or higher. Optionally, other dimensions and aspects ratios may be used, for example, 1280×720, 1920×1200 or 3200×2048 pixels. Optionally, image 102 is of a multi-mega pixels.

The compression outlined in FIG. 7 may be particularly efficient for large images, while maintaining a good visual quality of the decoded image relative to other conventional compression methods.

In exemplary embodiments of the invention, the dimensions of tile 104 are adapted to the capabilities of the video or video resource. Optionally, dimensions of tile 104 are responsive to the capabilities of equipment in terms of standards or resources such as memory or processing power or a particular coder or device. Optionally, the dimensions of tile 104 are 320×240 pixels. Optionally the dimensions are 720×576 PAL or 720×480 NTSC Optionally, other dimensions and aspects rations may be used.

In exemplary embodiments of the invention, the compression of a tile 104 in a frame 202 is carried out by compression of blocks 106 comprised in tile 104.

In exemplary embodiments of the invention, blocks 106 are determined by the equipment such as codec used to construct video 200 (e.g. MPEG 16×16 pixels macro-blocks).

In exemplary embodiments of the invention, the blocks dimensions (extents) are 8×8 pixels. Optionally, the block dimensions are 16×16 pixels. Optionally, the dimensions are 4×4 pixels. Optionally, other dimensions are used. Optionally or additionally, the blocks dimensions may not by identical, such as 8×16, 4×8, 2×32 or 1×64.

In exemplary embodiments of the invention, a tile 104 is compressed without divisions to blocks in a tile.
Video Sequence In exemplary embodiments of the invention, the video sequence 200 comprises one or more groups of frames (GOP) 204. The number of frames 202 in a GOP 204 is responsive to the capabilities of the encoding tools (e.g. a codec). Optionally, the number of frames in a GOP is may vary, optionally by the equipment or tools setup or during operation.

FIG. 2 schematically illustrates how image 102 tiles 104 are arranged as encoded frames 202 in GOP 204 in a video sequence 200, in accordance with exemplary embodiments of the invention.

In exemplary embodiments of the invention, frames 202 are ordered from the image 102 in a raster order of tiles 104, such from top-left to the right and onwards in a next row. Optionally, other orders are used to select tiles 102, for example, the frames are ordered or related in the video sequence 200 responsive to similarities between consecutives tiles so that the difference would be smaller relative to other orders and a better compression may be achieved, as discussed below.

In exemplary embodiments of the invention, the determination of tiles 102 order in video 200 is responsive to the blocks contents, for example, similarities between blocks entropy, entropy deficiency or geometry, either inside a tile 104 or between tiles, in order to achieve better compression and/or decoded image quality due to the similarities between the blocks in exemplary embodiments of the invention, only some of the tiles, or parts thereof, are used for frames 202 in the video sequence 200, for example, responsive to a region of interest, while discarding the others. Optionally, some tiles are compressed to a certain level while others compressed to another level, for example, a region of interest (e.g. center region) is compressed lesser extent relative to other regions in order to achieve a better quality in the decoded image for the region of interest.

Spatial Compression & Transformation

In exemplary embodiments of the invention, the initial frame in a GOP 204 (e.g. 202A derived from tile 104A) is spatially compressed. Optionally, a tile, or part thereof, is compressed. Optionally, the tile is compressed by compressing blocks 106, that is, each or some of the blocks are compressed independently.

In exemplary embodiments of the invention, the compression comprises a quantization of a brightness or color range into a smaller range. For example, assuming the original range in section is 120 values, using a compression of 20 will yield only 6 discrete levels. Optionally, the division is linear, such as uniform binning. Optionally, the division is not linear, i.e. non-uniform binning, optionally responsive to the brightness or color distribution and/or possible visual effect. For example, a denser distribution of values may be more finely divided than a sparser distribution, a bright range may be divided finer than dim range (which the human eye may not discern the coarser differences). Optionally, the quantization is into a set of color indexes with a corresponding palette (brightness or color lookup table). The resulting 6 indexes may be used to map into a palette to obtain brightness/color values which may depict the original image more closely than dividing the range. Optionally, the palette is shared by one or more section.

In exemplary embodiments of the invention, a block is quantized independently of other blocks or tiles. Optionally, the quantization is responsive to the contents of a block or a plurality of blocks, for example, having similar contents or entropy.

In exemplary embodiments of the invention, a tile is transformed wherein the transformation comprises a DFT such as DCT, or a wavelet transformation, or other methods of the art such as vector or fractal compression. Optionally, a compressed tile is transformed. Optionally or additionally, the transformed tile is quantized, for example, some of the coefficients of a DCT are eliminated (or quantize), optionally the higher frequency coefficients, optionally similar to the JPEG method.

In exemplary embodiments of the invention, a block is transformed independently of other blocks or tiles. Optionally, the transformation is responsive to the contents of a block or a plurality of blocks, for example, having similar contents or entropy.

Difference and Temporal/Motion Compression

In exemplary embodiments of the invention, intermediate frame 202P comprises a difference of its contents relative to the content of tile 104 (respective to tile 202I). Optionally, the difference is relative to a compressed initial frame 202I. Optionally, the difference is relative to decompressed (decoded) frame 202I. Optionally, the difference is at least compressed as discussed above, the compressed difference comprising a temporal compression. Subsequent frames are, optionally, compressed likewise.

In exemplary embodiments of the invention, a subsequent frame, such as 202Q, is constructed as a difference to tile 104B. Optionally, 202Q is constructed such that it comprises a difference to a combination decompressed 202I and 202P. Optionally, the difference is compressed, further comprising a temporal compression. Subsequent frames are, optionally, compressed likewise.

In exemplary embodiments of the invention, the temporal compression comprises a motion compression so that the intermediate frames comprise motion difference relative to a preceding frame (e.g. I-frame or preceding P-frame).

Figure 3:
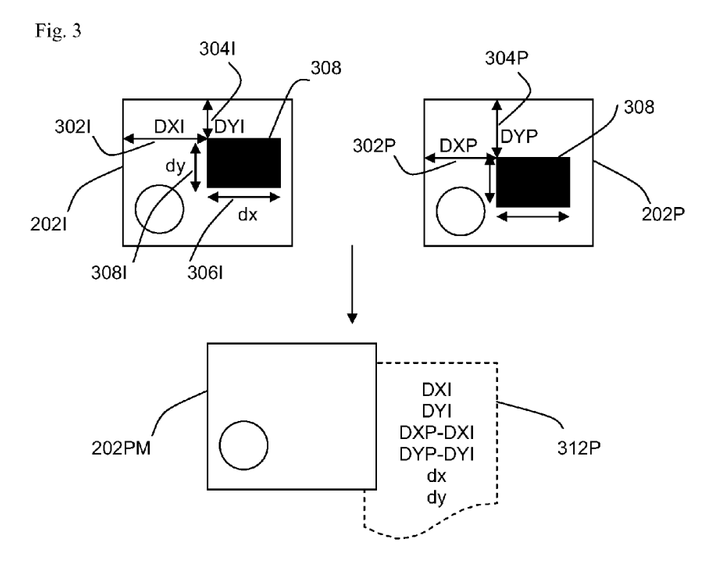
FIG. 3 schematically illustrates a motion compression of a rectangular feature that occurs in two frames, in accordance with exemplary embodiments of the invention.

FIG. 3 schematically illustrates a motion compression of a rectangular feature 308 that occurs in two frames, 202I and 202P, in accordance with exemplary embodiments of the invention. Rectangle 308 has dimensions dx and dy (306 and 308, respectively) with offsets at 202I as DXI and DYI (302I and 304I, respectively) and offsets at 202P as DXP and DYP (302P and 304P, respectively). The temporally compressed frame 202PM of 202P comprises, or associated with, data 312. Data 312 comprises the dimensions of the rectangle (306 and 308) and its original location in 202I (302I and 304I) and the motion, i.e., the relocation DXP-DXI & DYP-DYI of rectangle 308 from frame 202I to 202P (or from respective tiles 104 and 104B). This scheme is frequently more economic in terms of data volume than other compression techniques since only a few numerical values are stored rather than a large number of pixels (dx×dy), even if they are compressed. Data 312 optionally comprise part of a frame such as 202PM, or stored in a separate frame or separately of frames 202I or 202P or 202PM. Optionally, the motion parameters are stored as dedicated frames.

Scalable Compression

In exemplary embodiments of the invention, scalable compression is performed, comprising encoding of the same tile (or part thereof) into frames with different compression levels. The scalable compression allows a consequent decoding of the video sequence to reconstruct the image in several quality levels.

Figure 5:
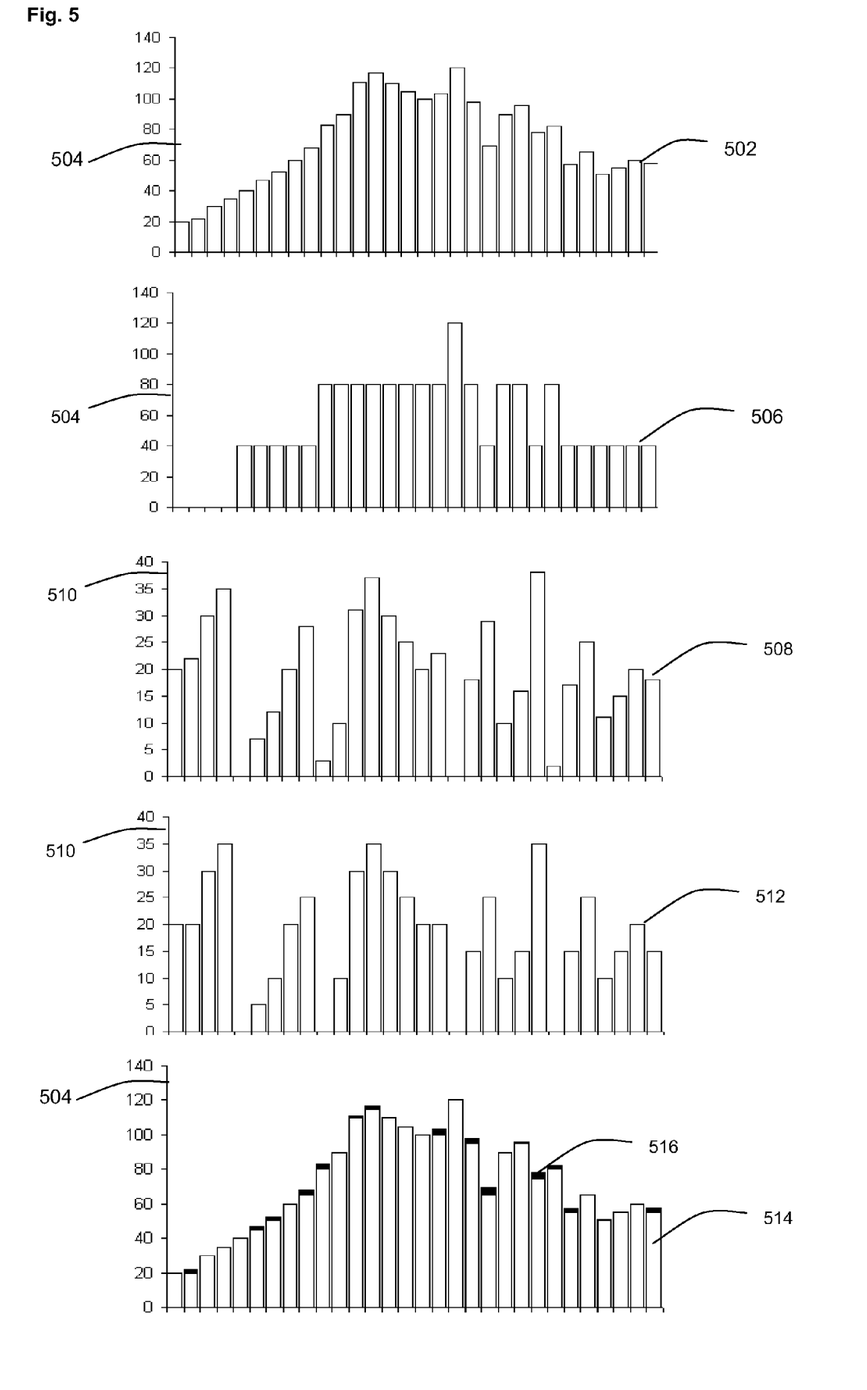
FIG. 5 schematically illustrates (a) intensity levels of a tile of an image, (b) its quantization (as in I-frame before further encoding), (c) its difference relative to the original tile (as in P-frame before further processing), (d) quantization of the difference, and (e) a comparison of the a combination (addition) of the quantized levels to the original levels, in accordance with exemplary embodiments of the invention.

FIG. 5 schematically illustrates (a) intensity levels 502 of a tile of an image 102, (b) its quantization 506 (e.g. tile 102A or I-frame 202I before further encoding), (c) its difference 508 relative to the original tile 104A (as in P-frame 202P before further processing), (d) quantization of the difference 512, and (e) a comparison of the a combination (addition) 514 of the quantized levels 506 and 512 to the original levels 502, in accordance with exemplary embodiments of the invention.

In exemplary embodiments of the invention, the range 502 of the levels of tile 104A are quantized by a factor (40), reducing them to 4 levels 506, which may be encoded (compressed) more effectively in frame 202I relative to the original range 504.

The difference 508 between the levels 506 of quantized tile 102A and the original levels 502 of tile 102A shows that the difference range 510 is smaller 504 relative to the original range 502 (finer details).

The difference levels 508 are quantized 512 ('Diff-1') with a lower factor (5) than 502, reducing them into a range of 8. The quantized difference 512 are encoded into frame 202P.

When the two quantized differenced 508 and 512 are combined (e.g. in a decoding operation), they approximate 514 the original level 502, the residues (difference) shown as dark ranges 516.

A subsequent frame 202Q may be constructed by obtaining the difference between the levels 502 of tile 104A and the combination of quantizations 508 and 512, shown as dark levels 516, quantizing the difference (yielding Diff-2) and encoding in the video stream as described above. The difference 516 is finer than 508 since the combination of a degree of quantizations progressively approaches original tile 104A. Subsequent difference frames may be encoded comprising still finer details (Diff-n).

In exemplary embodiments of the invention, in order to find a difference (Diff-j) the preceding frames (I-frame to P-frame-j−1) are decoded (decompressed or reconstructed) rather than storing the respective quantized tile 104A and the quantized P-frames (e.g. 506 and 512).

Figure 4:
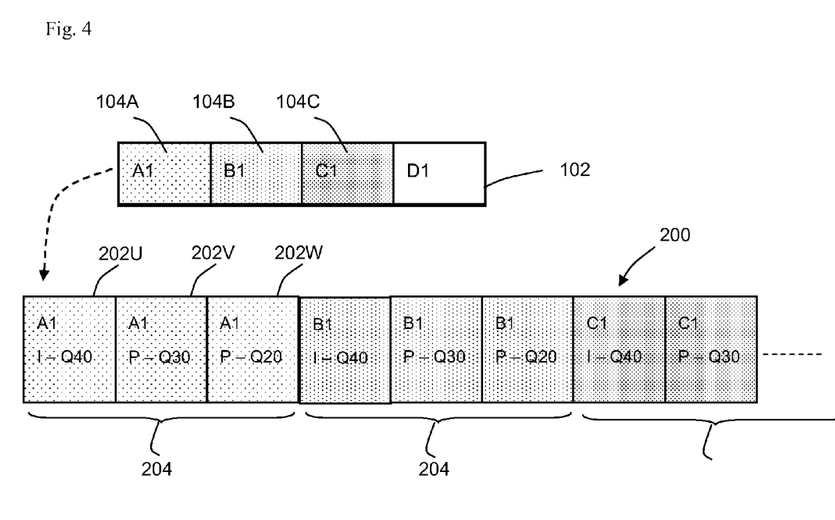
FIG. 4 schematically illustrates an arrangement of a video sequence comprising an encoded plurality of the same tile in different compressions, in accordance with exemplary embodiments of the invention.

FIG. 4 schematically illustrates a video sequence 200 comprising an encoded plurality of the same (duplicates) tile 102A as frames 202U 202V and 202W in GOP 204, in accordance with exemplary embodiments of the invention.

In exemplary embodiments of the invention, each frame 202U to 202W is encoded based on a quantization factor Qnn, shown as Q40, Q30, Q20 for factors 40, 30 and 20, respectively, as described above. The quantization factor Qnn is decreasing in GOP 204 (from 40 to 20) so that further frames retain finer details as the range of the differences gets smaller, as described above and illustrated in Diff-2 516 relative to Diff-1 508.

In exemplary embodiments of the invention, when video 200 is decoded, tile 104A may be obtained by decoding only frame 202U, yielding a lower quality (ranges 506) with respect to decoding and combining frames 202U and 202V (ranges 514). A still better quality may be obtained by decoding and combining frames 202U, 202V and 202W, and so on.

In exemplary embodiments of the invention, a region of interest (e.g. center region of image 102) may be compressed with a scalable compression with finer difference (higher level Diff-n) while the rest of the image is regularly compressed. This allows to obtain a decoded image where the interesting parts are of higher quality than the rest, giving an overall satisfactory quality while reducing the volume of the video sequence.

In exemplary embodiments of the invention, the P-frames are organized in the video sequence according to their compression or quantization level. Optionally, the P-frames are organized as a sub-sequence in the video sequence.

Intermittent Compression

In exemplary embodiments of the invention, an intermittent, or 'on the fly', (synchronous) compression of an image in a video sequence is employed.

Figure 8:
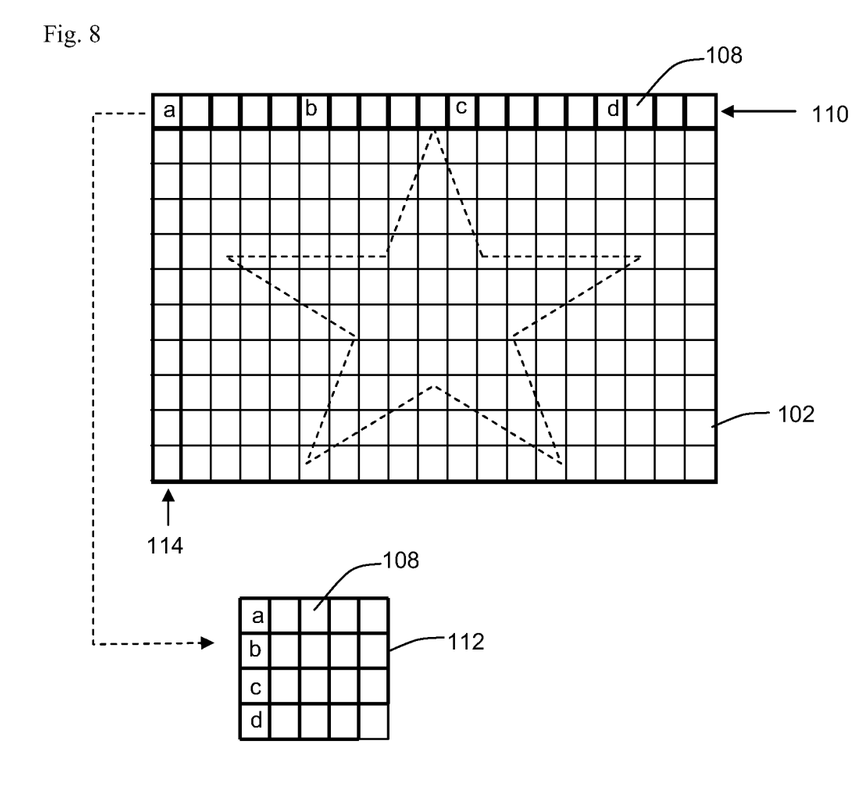
FIG. 8 schematically illustrates an image comprised of rows of pixels, wherein the row is constructed in a rectangular format (or part thereof) for encoding as a frame in a video sequence, in accordance with exemplary embodiments of the invention.

FIG. 8 schematically illustrates an image 102 comprised of row 110 of pixels 108, wherein row 110 is constructed in a rectangular format (or part thereof) 112 for encoding as a frame in a video sequence, in accordance with exemplary embodiments of the invention.

In exemplary embodiments of the invention, instead of using a tile 104 of image 102 as described above, the intermittent compression uses row 100 in image 102. Row 100 is 'folded' into a rectangular format (or part thereof) 112, wherein rectangle 112 is encoded as a frame 202 in video sequence 200 as discussed above. Optionally, the frame is padded with known or special values to distinguish the image contents from the padding. Additionally or alternatively, one or more rows 100, or part of rows, may be encoded in the same frame 202.

In exemplary embodiments of the invention, the intermittent compression method allows a fast consecutive input for encoding, avoiding random addressing and buffer memory for tiles, or requiring only a small buffer relative to a random tile. For example, if image 102 is stored in some compression or encoding, such as JPEG or run length encoding such as PCX or fax, it is not required to decode the whole image or a large part thereof, but, rather, the current candidate rows for compression.

In exemplary embodiments of the invention, the compression may be halted, or paused, to allow other activities of the device in which the compression is taking place, and continued when the resources are available. For example, intermittent encoding in a cellular phone (which typically has limited resources with respect to other devices such as a personal computer) requires negligible buffer memory (e.g. only the pointer to the next row). Additionally, the compression may be started, and if a voice conversation is begins, the compression is paused at the end of row 110 or its encoding to yield the necessary resources (e.g. processor time) for the conversation, and when the latter is finished, the compression resumes at the next row.

In exemplary embodiments of the invention, the compression may be performed 'on the fly' (synchronously) with a piece-wise acquisition of image 102. For example, a scanner which consecutively provides image lines as the scanning proceeds (e.g. moving head in a flatbed scanner or deflecting ray in laser scanner) without having to store the whole image (or large part thereof). As rows 110 are provided from the scanner, the intermittent compression begins, without waiting for the scanner to finish scanning the whole area, and continues as the scanner provides more lines. The intermittent compression may allow other activities in the encoding device while the scanner moves (or a ray deflects) if the latter is slower than the encoding of one or more rows 110.

In exemplary embodiments of the invention, one or more rows 110, or part thereof, are compressed to form rectangular format 112. Optionally, the length of one or more rows 110, or part thereof, or and dimensions of rectangular format 112, are responsive to the capabilities and/or stetting of the encoding tools (e.g. a codec).

In exemplary embodiments of the invention, depending on image 102 organization and/or encoding tools, a column 114, rather than row 110, is accessed and used to encode a frame 202.

Coder (Codec)

In exemplary embodiments of the invention, an existing video coder such as a codec (encoder/decoder), or part thereof comprising the coding part of the codec, is used to compress image 102, optionally with temporal and/or motion compression.

In exemplary embodiments of the invention, the coder comprises one or more software modules and/or libraries. Optionally, the coder comprises hardware and/or firmware. Optionally, the coder comprises a chip-set with internal or external memory and/or one or more processors. Optionally, the coder is part of a device.

In exemplary embodiments of the invention, the chipset is used on mobile devices such as cameras or cellular phones or PDAs. Optionally, the coder (or codec) is part of the device.

In exemplary embodiments of the invention, off-the-shelf or proprietary tools for constructing a video sequence are utilized to construct video sequence 200 from image 102. Optionally, the tools comprise SDK (software development kit) using techniques such API or procedure calls to construct the video sequence 200. Optionally or additionally, hardware modules are used. Optionally, a combination of software, hardware or firmware is used.

In exemplary embodiments of the invention, the coder is linked to an imaging sensor. Optionally, the sensor transfers the image to a memory. Optionally, the sensor may be tapped for the image. Optionally, the sensor is a part of the chip-set.

In exemplary embodiments of the invention, processors may be used in coding, such as a general purpose image co-processor (ICP), an application processor or a communications processor. Optionally, the processor is a dedicated processor.

In exemplary embodiments of the invention, the coder may accept operation parameters such as compression level, type of compression, number of frames in a GOP or other parameters such as the required bit rate. For example, by setting a configuration file or using API (application programming interface) to set the parameters.

In exemplary embodiments of the invention, the video sequence may be stored in memory, optionally for subsequent decoding or transfer to another device. Optionally, the video sequence may be 'streamed', that is, transferred as it is constructed.

In exemplary embodiments of the invention, providing a plurality of the same tile (or blocks) to the coder, the coder facilitates a plurality of compression (and fidelity) levels of the same image region by generating a difference Diff-n as described above, wherein the differences are spatially and/or temporally and/or motion compressed.

In exemplary embodiments of the invention, the coder is adapted for video standards such as AVC (H.264), MPEG 1/2/4 or other formats. Optionally, a coder for non-standard formats is used.

Metadata Etc.

In exemplary embodiments of the invention, metadata defining the arrangement of the frames with respect to image 102 data in the video sequence for optional subsequent is embedded in the video sequence. Optionally, the metadata comprise information such as the organization and identification of the contents of the video sequence and the frames, or an organization of the image in terms of tiles or blocks embedded or encoded in the frames so that the decoded frames will fit into the respective tiles 104 (or rows 100) of image 102. Optionally, at least a part of the metadata is encoded inside a frame or frames of the video in the same manner as visual data. Optionally, a part of the metadata is comprised outside the video sequence, but, optionally stored together with it, such as in a file.

Optionally, a frame comprises metadata, for example, the ordinal value of the frame in GOP 204 or in the video sequence 200, the location of the respective tile in the image or motion information (e.g. 312P in FIG. 3).

In exemplary embodiments of the invention, a one or more thumbnails of the image, or part thereof, is stored and/or encoded in video sequence 200, optionally within a frame or frames or GOP 204. Optionally or alternatively, the thumbnails are not part of the video sequence, but, rather, stored separately or together with the video sequence, optionally as metadata. Optionally, the thumbnails are quantized, for example, as JPEG. Optionally or additionally, the thumbnails are not quantized but comprise a reduced resolution of the original image 102.

In exemplary embodiments of the invention, the video frames, with optional metadata is structured into a file or a data structure. Optionally, the file or data structure comprise additional information about the image, or metadata, such as in EXIF or DCF.

Overall Outline Flowchart

Figure 6:
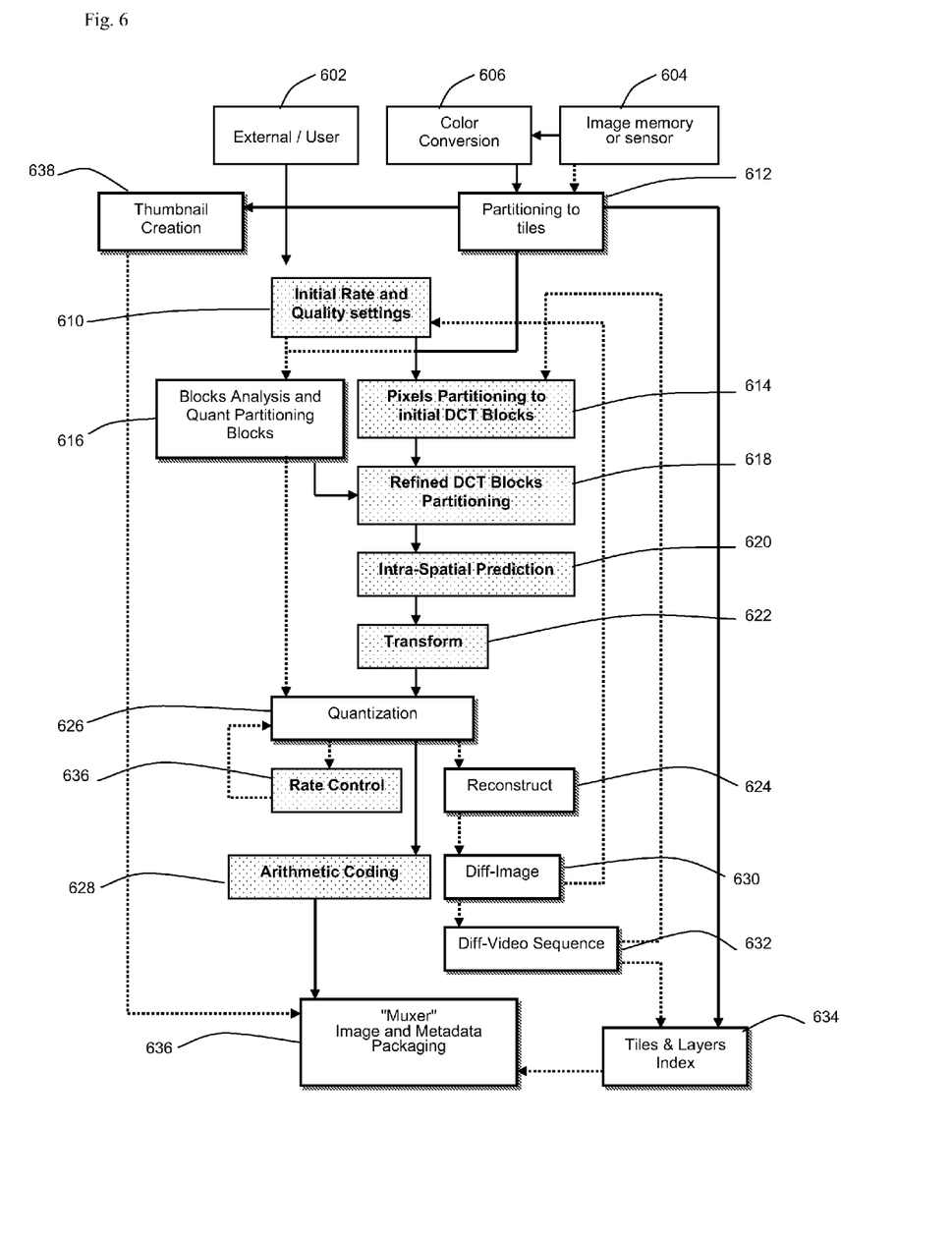
FIG. 6 schematically illustrates a flowchart of encoding an image in a video sequence frames and a file, in accordance with exemplary embodiments of the invention.

The scalable compression, as a ingredient in a compression of an image 102 in video sequence 200 is schematically summarized in FIG. 6.

FIG. 6 schematically illustrates a flowchart of compressing an image in a video sequence frames and a file, where the textured areas and continuous lines represent a part of typical operation flow for an initial frame of a GOP of a coder, while the shaded boxes and doted lines represent additional particular operations for intermediate frames, in accordance with exemplary embodiments of the invention. (common paths are either dotted or continuous lines and common steps are either shaded or not, e.g. 'Quantization' 626).

External settings or parameters (610) are provided (602). Optionally, the parameters, or part thereof, are provided by a user such as by configuration file or API. The parameters may comprise the rate (bits per second of the video sequence 200) or the quality level (e.g. as the range of luminance or colors relative to the original).

Image 102 is obtained from a memory store such as internal RAM or SRAM, memory card or right off a sensor (604), or, alternatively, from a communication or acquisition stream.

The image is, optionally, separated into channels, such as RGB, YIQ, YUV, etc. (606), as described later on.

The image, or a channel thereof, is divided into tiles 104 at (612), optionally the division is virtual, that is, addressing the image to pick up data of a tile.

A tile that starts a GOP (in an I-frame) is fed for initial partitioning for DCT transformation (614).

Additionally, and optionally in parallel, the tile is fed for analysis to identify the blocks 106 responsive to the contents such as color range, quality, complexity or entropy (616) in order to achieve efficient compression and quality decoded image. Optionally, blocks of different sizes are selected relative to 614.

The partitions defined in 614 are refined to match those of 616, for example the blocks boundaries and/or sizes (618). The partitions, or blocks, of 618 are analyzed and spatial prediction of one block relative to another is performed and the difference between the prediction and actual contents is obtained (620) and transformed by DCT (622). A brief note on prediction is given later on.

The DCT coefficients are quantized (626), i.e. some coefficients (high frequencies) of the transform are reduced or eliminated, optionally responsive to rate settings (636). Optionally, the quantization is carried out using a quantization table, and the table is stored for subsequent image restoration. The quantized coefficient are entropy encoded, optionally by arithmetic coding (628) (such as in JPEG compression)

Up to here the initial frame (I-frame) in a GOP is spatially compressed and encoded (layer 1) in the video stream, together with metadata indicating the tile corresponding to the frame (636).

Subsequently intermediate frames (e.g. P-frames) as difference layers (Diff-n) are encoded.

The coded I-frame is reconstructed (624), or alternatively saved after quantization (626), to provide a reference for further differences Diff-n and onwards, as described above with respect to levels 506 in FIG. 5.

The reconstructed frame is subtracted from the original frame (e.g. the tile corresponding to the frame as shown in 502), yielding a difference tile (Diff-1) (630) as illustrated in 508 of FIG. 5. The difference tile (Diff-1) is subsequently spatially compressed as before (614-618-620-622-626-628), forming a temporal compression, and constructed as a P-frame in the video sequence (layer 2) (632), whereas the metadata of its position in the image is constructed (634) and stored with the metadata (636).

Additionally, optionally the intermediate frame corresponding to Diff-1 is reconstructed, or alternatively saved after quantization (626). Diff-1 is added to a reconstructed (I-frame or its saved quantization), yielding an approximation of image 102 (as 514 in FIG. 5). The approximation is subtracted from the original initial frame, yielding a second order difference (as shown in 516), that is quantized as Diff-2 and encoded (layer 3).

Additionally, optionally more duplicated tiles may be processed as intermediate frames, Diff-n (layer n+1). Optionally or alternatively, a new tile is processed starting another GOP.

In exemplary embodiments of the invention, a thumbnail of the image or part hereof, or of a tile, is constructed (638) and stored with the frames (632, 636), optionally, with metadata to indicate the respective position of the tile in the image 102 (634). The thumbnail may be used later on for display preview or display navigation of the decoded image.

Decoding (Decompressing)

Figure 9:
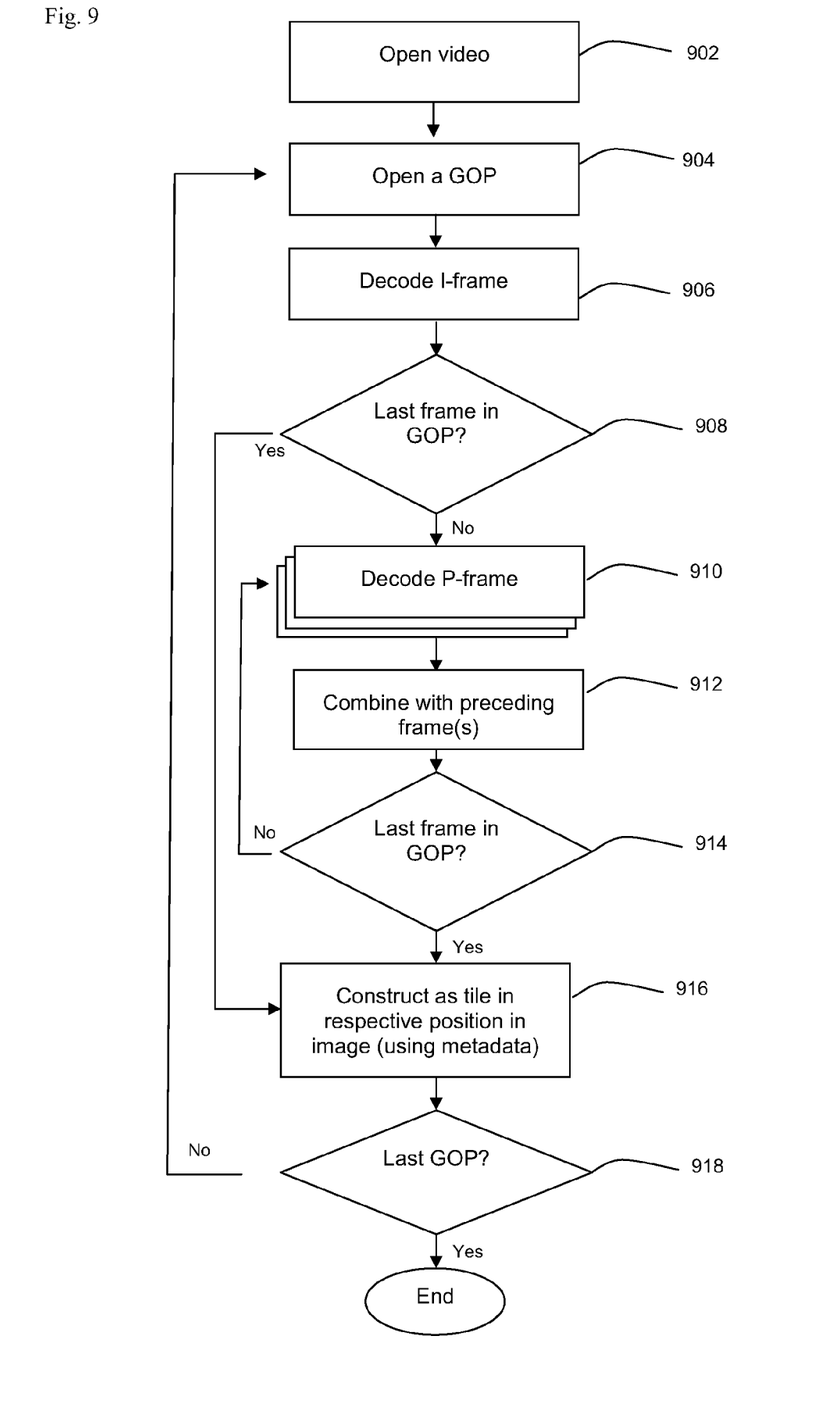
FIG. 9 schematically illustrates a flowchart outlining a sequence of operations of decoding an image compressed in a video sequence by a scalable compression, in accordance with exemplary embodiments of the invention.

FIG. 9 schematically illustrates a flowchart outlining a sequence of operations of decoding an image 102 compressed in a video sequence 200 by a scalable compression, in accordance with exemplary embodiments of the invention.

In exemplary embodiments of the invention, video 200 is opened for access (902). A GOP 204 is opened (accessed) (904) and an I-frame is decoded (906). If the I-frame is the last frame in the GOP (908) then the metadata is consulted to place the decoded tile in its respective position in image 104 (916) and next GOP 204 is opened (904). Otherwise, a subsequent P-frame is decoded (910) and combined with the preceding frame. If more P-frames are present in GOP 204 then they are decoded and combined with preceding frames (910 & 912). If no more frames are present in GOP 204 (914) then the metadata is consulted to place the decoded tile in its respective position in image 104 (916). If more GOP 204 is present the next one is opened and accessed (204), otherwise the decoding ends.

In exemplary embodiments of the invention, video 200 is read (902) from a streaming video, optionally with some buffering.

In exemplary embodiments of the invention, the metadata is not used for locating the tile, but, rather, a preset order of the frames is used to locate the respective tile 104 in image 102.

The combined ('stitched') tiles comprise a decoded image resembling, or similar to a certain extent, the original image 102.

Optionally, only a part of the image tiles are extracted and combined to yield only a part respective to the original image 102. Optionally, tiles are decoded responsive to the display capabilities of the device. For example, if the display is of lower dimensions than the image, tiles of a region of interest that match the display dimensions are decoded. Optionally or alternatively, the image is re-sampled to match the device dimension.

In exemplary embodiments of the invention, an image may be decoded selectively according to the compression levels of a plurality of the same tile (or block), as described above, to obtain a similarity to the original image, or fidelity of the decoded image or part thereof, to a certain degree. Optionally, frames with the required or acceptable compression (or fidelity) are selected, decoded and combined to form an image of part thereof.

In exemplary embodiments of the invention, an image may be decoded responsive to setting or parameters of size and/or resolution and/or quality of the resultant decoded image. For example, determining frames such that their decoded information is sufficient for, or approximate to, the quality parameters (e.g. intensity or color ranges or blockiness). Optionally, the combination of the decoded information, such as combination of quantized initial frame and additional difference layers satisfy, or approximate, the parameters of size and/or resolution and or quality.

In exemplary embodiments of the invention, in order to achieve better quality or fidelity to the original image from the quantized (compressed) frames, some techniques of the art that reduces possible blocky or patchy appearance of the decoded image may be used. For example, dithering of blocks boundaries may be used, that is, mixing pixels about a block boundary.

In exemplary embodiments of the invention, an existing decoder (optionally comprised in a codec), or off-the-shelf or proprietary tools for decoding a video sequence are used to extract tiles 104 (or blocks 106) from the video sequence. Optionally, the tools comprise SDK using techniques such as API or procedure calls. Optionally or additionally, hardware modules are used. Optionally, a combination of software, hardware or firmware is used. Optionally, the hardware and firmware, and optionally memory, comprise a chip-set. Optionally, the chip-set is used on mobile devices such as cameras or cellular phones or PDAs. Optionally, the decoder, or codec, is part of a device.

Optionally, one or more processors may be used in decoding. For example, a general purpose processor, an image co-processor (ICP), an application processor or a communications processor. Optionally, the processor is a dedicated processor.

Encryption

In exemplary embodiments of the invention, the order of frames 202 in video sequence 200 are scrambled, that is, shuffled to form a different order so that conventional decoding (e.g. a codec) will not yield the image. Optionally, the metadata that indicate the frame order and/or position of respective tile 202 in image 102 is provided separate of the video sequence to the decoder (or person that employs the decoding). Optionally, the metadata is inserted as frames (or inside frames) and marked so that the decoder will be able to locate and interpret it. Optionally or alternatively, the metadata is encrypted in the video sequence by a method or keys known or provided to the decoder (or person).

Some Variations and Highlights

In exemplary embodiments of the invention, the compression of tiles employs an Entropy Deficiency Quantization strategy, where the quantization levels of the blocks of pixels is set according to the desired bit rate and/or quality, based on the entropy deficiency (reduction) of the blocks of pixels. Optionally, this method yields substantially smoother, higher fidelity and more realistic image for a human vision system than conventional techniques such as JPEG.

In exemplary embodiments of the invention, image 102 or part thereof is separated into a plurality of channels, such as RGB, CMYK, HSV (HSB), YIQ, YUV, YCrCb, xvYCC, or their derivatives or variations, or any separation of the art. Optionally, each channel, or a combination of channels, is compressed separately. It should be noted that different channels may be compressed differently, at least partially. For example, chrominance channels may be quantized (compressed) more than the luminance since the luminance is perceived better than chrominance by the human visual system.

In exemplary embodiments of the invention, the difference of a P-frame comprises a prediction of its contents relative to a previous frame or frames (the prediction typically requires small amount of data) and the actual contents of the P-frame is constructed as a difference to the predicted contents. The rest of the operation is as describe above.

In exemplary embodiments of the invention, blocks 106 of tile 104 may be constructed and compressed in a frame 202 wherein the blocks do not form a rectangular format. For example, blocks of 'plus' (+) form that share a similar geometry or entropy for efficient compression.

In the description and claims of the present application, each of the verbs "comprise", "include" and "have" as well as any conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to necessarily limit the scope of the invention. In particular, numerical values may be higher or lower than ranges of numbers set forth above and still be within the scope of the invention. The described embodiments comprise different features, not all of which are required in all embodiments of the invention. Some embodiments of the invention utilize only some of the features or possible combinations of the features. Alternatively and additionally, portions of the invention described/depicted as a single unit may reside in two or more separate physical entities which act in concert to perform the described/depicted function. Alternatively and additionally, portions of the invention described/depicted as two or more separate physical entities may be integrated into a single physical entity to perform the described/depicted function. Variations of embodiments of the present invention that are described and embodiments of the present invention comprising different combinations of features noted in the described embodiments can be combined in all possible combinations including, but not limited to use of features described in the context of one embodiment in the context of any other embodiment. The scope of the invention is limited only by the following claims.

All publications and/or patents and/or product descriptions cited in this document are fully incorporated herein by reference to the same extent as if each had been individually incorporated herein by reference or if they were reproduced in full herein.

The invention claimed is:

1. A computerized method for decoding a sequence of video frames using a processor, comprising:
   (a) receiving a sequence of video frames wherein each said video frame separately compresses one of a plurality of tiles divided from a still image; and
   (b) decoding, using the processor, said sequence of video frames, each said frame in the video sequence being decoded to extract one of said plurality of tiles; and
   (c) combining the plurality of tiles to encode said still image.

2. A method according to claim 1, wherein the decompression comprises decompression of a spatial and/or temporal and/or motion compression.

3. A method according to claim 2, wherein the decompression is of a compression responsive to the geometry and/or entropy and/or entropy deficiency of a tile or part thereof.

4. A method according to claim 1, wherein different tiles are compressed in different compression levels.

5. A method according to claim 1, wherein the decompression comprises:
   (a) assembling each said tile from a plurality of blocks;
   (b) decompressing one or more blocks in a frame;
   (c) assembling each said tile from said one or more blocks;
   wherein
   (d) a block size and/or shape is responsive to the compression level of a tile and/or compression ratio and/or required bit-rate and/or contents of the image or part thereof.

6. A method according to claim 5, wherein a block extent parallel to the image dimension comprises at least one of 1, 2, 4, 8, 16, 32 or 64 pixels.

7. A method according to claim 1, wherein the video sequence comprises metadata comprising information on the correspondence between a frame and a tile in the image.

8. A method according to claim 1, wherein the decompression uses an existing that comprises a chip-set.

9. A method according to claim 1, wherein said
   combining comprises combining the tiles according to their relative positions in the image.

10. A method according to claim 1, wherein the decompression uses an existing equipment and/or software.

11. A method according to claim 10, wherein the existing equipment comprises a standard codec or part thereof.

12. A method according to claim 11, wherein the codec is compatible with a standard video format.

13. A method according to claim 7, wherein the metadata is used to locate the relative position of a tile in the image.

14. A computer program product for decoding a sequence of video frames, comprising:
   a computer readable storage medium;
   first program instructions to receive a sequence of video frames wherein each said video frame separately compresses one of a plurality of tiles divided from a still image;
   second program instructions to decode said sequence of video frames, each said frame in the video sequence being decoded to extract one of said plurality of tiles; and
   third program instructions to combine the plurality of tiles so as to encode said still image;
   wherein said first, second, and third program instructions are stored on said computer readable storage medium.

15. An apparatus for decoding a sequence of video frames using a processor, comprising:
   a processor;
   a decoder which receives a sequence of video frames wherein each said video frame separately compresses one of a plurality of tiles divided from a still image, decodes, using said processor, said sequence of video frames, each said frame in the video sequence being decoded to extract one of said plurality of tiles, and combines the plurality of tiles to encode said still image.

16. An apparatus for compressing a still image as a sequence of video frames, comprising:
   a processor;
   a coder which receives a still image which is not part of a sequence of video frames, divides the still image into a plurality of tiles using said processor, compresses each tile of said plurality of tiles, or part thereof, as a separate frame, generates a sequence of video frames wherein each of the plurality of tiles is set as a separate video frame, and outputs the video sequence.

* * * * *